G. L. McCLELLAN.
HOSE COUPLING.
APPLICATION FILED JUNE 5, 1914.
1,132,197.
Patented Mar. 16, 1915.
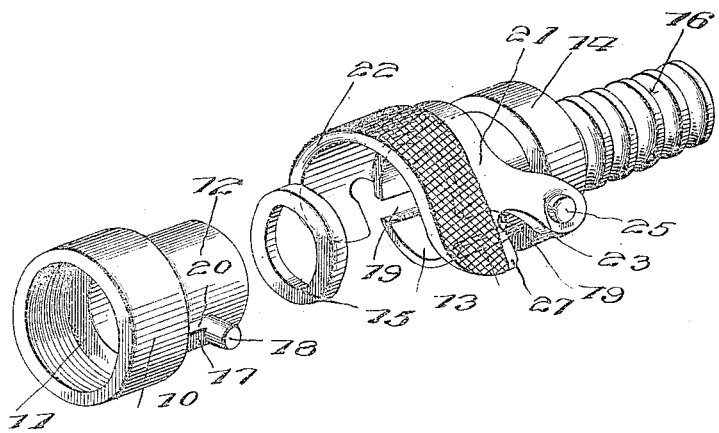
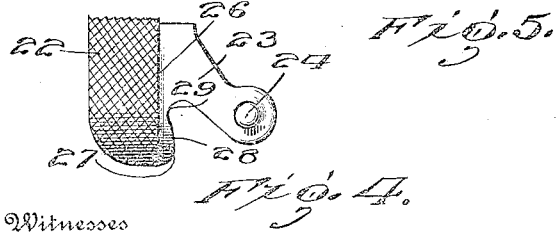
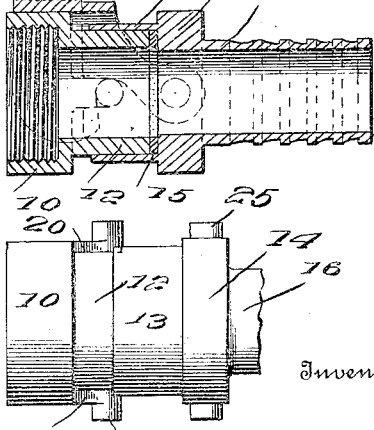
Witnesses
Inventor
G. L. McClellan
By
Attorneys

UNITED STATES PATENT OFFICE.

GEORGE L. McCLELLAN, OF GOLD HILL, OREGON.

HOSE-COUPLING.

1,132,197. Specification of Letters Patent. Patented Mar. 16, 1915.

Application filed June 5, 1914. Serial No. 843,297.

*To all whom it may concern:*

Be it known that I, GEORGE L. McCLELLAN, citizen of the United States, residing at Gold Hill, in the county of Jackson and State of Oregon, have invented certain new and useful Improvements in Hose-Couplings, of which the following is a specification.

My invention relates to new and useful improvements in hose couplings, and as its principal object aims to provide a device of this character consisting essentially in a male section, a female section and a locking yoke which is pivotally attached to the female section and is adapted, when moved into engagement with lateral lugs carried by the male section, to force the terminal of the male section with considerable pressure against a bearing gasket which is arranged interiorly of the female section.

A further object of my invention is to provide in connection with the lateral lugs of the male section a pair of longitudinal rib members which are contiguous with respect to the lugs and are adapted to be received within longitudinal slots formed in the terminal portion of the female section for not only holding the male section against rotation therein but also for properly centering the lugs so that they may be quickly positioned for engagement by the locking yoke.

An object of equal importance with the foregoing is to so position and design the locking yoke that it will, when in either open or closed position, or when being swung from one position to the other, lie within the longitudinal limits of the two sections of the coupling so that it will not be liable to engage with the clamping collars ordinarily employed in attaching lengths of hose to the sections of the coupling.

Another and more general object of my invention is to provide a coupling which will embody in its construction the desired features of simplicity, strength, efficiency and durability, and is so designed that it may be manufactured at a relatively low cost and may be readily and conveniently connected or disconnected.

The above recited and other incidental objects of a similar nature, which will be hereinafter more specifically treated, are accomplished by such means as are illustrated in the accompanying drawings, described in the following specification, and then more particularly pointed out in the claim, which is appended hereto and forms a part of this application.

With reference to the drawings, wherein there has been illustrated the preferred embodiment of this invention as it is reduced to practice, and throughout the several views of which similar reference characters designate corresponding parts, Figure 1 is a perspective view illustrating the male and female sections of the coupling and the sealing gasket in disassembled relation, the locking yoke being shown in its proper position with respect to the female section; Fig. 2 is a side elevation showing the two sections of the coupling in closed position with the coupling yoke in locking relation to the male section; Fig. 3 is a longitudinal section showing the male and female sections in closed position; Fig. 4 is a detail view in side elevation of the locking yoke; and Fig. 5 is a top plan view of the two sections of the coupling in partial open position with the coupling yoke removed.

In the particular embodiment of my invention shown in the accompanying drawings, the coupling includes, as stated, a male section, and a female section, which are adapted to be locked in closed position by means of a coupling yoke.

The male section of the coupling includes an annular internally threaded body portion 10, extending inwardly at the forward terminal of which is an annular flange or shoulder 11. This shoulder 11 forms, as will be plainly seen upon reference to Fig. 3, an abutment against which may be engaged the terminal of a sleeve or similar element such as is universally employed in connecting a hose length to a coupling. From the inner edge of the member 10 there extends outwardly and longitudinally a cylindrical sleeve 12 which, as shown best in Fig. 3, is adapted to be slidably received within a sleeve 13 formed on the female section of the coupling. This female section of the coupling includes a relatively thick annular body portion 14. The sleeve 13 is of greater internal diameter than the member 14 so that a sealing gasket, indicated at 15, may be disposed against the inner face of the member 14 and clamped thereagainst by the inner terminal of the sleeve 12 of the male section of the coupling. From the rear face of the body portion 14 of the female section there extends a threaded connecting sleeve 16 which has an internal diameter equal to the internal diameter of the member 14 and sleeve 12, thus producing through the coupling a passage of a uniform diameter. The member 16, is, of course, adapted to receive the terminal of a hose length in the usual and well-known manner.

As a means not only for holding the sleeve 12 of the male section against rotation in the sleeve 13 of the female section but for also properly positioning the male section for engagement by the coupling yoke, to be hereinafter described, there has been provided at diametrically opposed points of the sleeve 12 and exteriorly thereof, a pair of longitudinally extending ribs 17. These ribs 17 are substantially rectangular in shape and are formed with their outer faces flush with the outer face of the member 10, as shown particularly in Fig. 5. From the forward terminals of the ribs 17 extend lateral lugs 18 which are preferably cylindrical in shape.

At diametrically opposed points of the sleeve 13 there are formed, as shown best in Fig. 1, the longitudinally extending slots 19. These slots 19 are designed to receive the ribs 17 and are, therefore, made of a width equal to the approximate width of the ribs 17 so that the edges of the slots will engage against the upper and lower edges 20 of the ribs. When the sleeve 12 of the male section has been positioned within the sleeve 13 of the female section so as to dispose the ribs 17 in the slots 19, the lugs 18 project laterally through the slots so that they may be engaged by the coupling yoke 21 in the manner shown in Fig. 2.

The coupling yoke, which is illustrated in detail in Fig. 4, to which reference will now be had, consists in a substantially U-shaped body portion 22, from the rear edge of which extend the downwardly and angularly directed arms 23. The arms 23 are provided at their free terminals with apertures 24, so that they may be pivotally mounted on the lateral lugs 25 carried by the body portion 14 of the female section. On the rear edge 28 of the yoke body portion 22 and at the terminals thereof are formed projections 27, the outer edges 28 of which extend outwardly and at an angle to the edge 26 and lead to a notch 29 which is formed at the junction of the lower edges of the arms 23 and the edge 28.

As regards the operation of the coupling, it may be well to explain that the gasket 15 is abnormally compressed while the edges 28 are in engagement with the lugs 18, and that the gasket expands somewhat when the lugs 18 snap into the notches 29. The gaskets being preferably constructed of rubber, however, it is obvious that they may be compressed to such an extent that the slight expansion taking place when the lugs 18 move into the notches 29 will not be of such degree as to effect detrimentally the desired production of a water tight seal between the terminal of the sleeve 12 and the inner face of the body portion 14 of the female section of the coupling. In this connection, the reason for which the slots 19 are made of greater length than the distance which the lugs 18 are spaced from the inner edge of the member 10 will become apparent, for it will be seen that it is necessary to permit the lugs to move into the notches, when they are engaging the edge 28 of the yoke projection 27, to a point beyond the point at which they are disposed when the yoke is seated in complete locked position.

From the foregoing description, it will now be apparent that I have provided a coupling so constructed that all the objects which it seeks to attain may be efficiently accomplished.

It will be further noted that the device is relatively simple in construction, consisting as it does in three elements, a male section, a female section, and a one-piece locking yoke.

In reduction to practice, it has been found that the form of this invention illustrated in the accompanying drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claim.

Having thus described the invention, what is claimed as new is:—

A coupling including a male section consisting of an annular body portion, a cylindrical sleeve of less diameter than the body portion, diametrically opposed substantially rectangular ribs formed on the outer face of said sleeve, said ribs extending from the adjacent end edge of the body portion to a point intermediate the length of the sleeve and having their outer faces flush with the outer face of the body portion, and laterally extending substantially cylindrical lugs projecting from the outer terminals of the ribs, a female section including an annular body portion, and a sleeve of less diameter than the body portion, said sleeve having an internal diameter equal to the external diameter of the first mentioned sleeve and being provided at its free terminal with longitudinally extending diametrically opposed slots adapted to snugly receive the said ribs and lugs with the lugs projecting laterally through the slots and spaced from the inner ends thereof when the sections are assembled, and a pivoted substantially U-shaped locking yoke carried by the body portion of the female section, said locking yoke being adapted to embrace the body portion of the male section to seat thereon in engagement with the lugs.

In testimony whereof I affix my signature in presence of two witnesses.

GEORGE L. McCLELLAN. [L. S.]

Witnesses:
 LYNN W. SMITH,
 FLOYD L. EDDINGS.

Copies of this patent may be obtained for five cents each, by addressing the "Commissioner of Patents Washington, D. C."